Jan. 19, 1926. 1,570,542
E. E. WINKLEY
EQUILIBRATING APPARATUS
Filed Sept. 28, 1920 2 Sheets-Sheet 2

Patented Jan. 19, 1926.

1,570,542

UNITED STATES PATENT OFFICE.

ERASTUS E. WINKLEY, OF LYNN, MASSACHUSETTS.

EQUILIBRATING APPARATUS.

Application filed September 28, 1920. Serial No. 413,447.

*To all whom it may concern:*

Be it known that I, ERASTUS E. WINKLEY, a citizen of the United States, residing at Lynn, in the county of Essex and State of Massachusetts, have invented certain new and useful Improvements in Equilibrating Apparatus; and I do hereby declare the following to be a full, clear, and exact description of the invention, such as will enable others skilled in the art to which it appertains to make and use the same.

The present invention relates to controlling mechanism for movable objects and more particularly to apparatus for maintaining a flying machine or other object in a condition of substantial equilibrium.

An apparatus of this type is usually adapted to actuate ailerons or other guiding devices to restore the flying machine or other object to equilibrium upon displacement therefrom. Heretofore, it has been proposed to operate the guiding devices in such a manner that the amount of restoring movement imparted thereto and, consequently, the amount of force applied thereby to restore the object to equilibrium upon displacement therefrom, is proportional to the degree of displacement of the object from equilibrium. It will be apparent, however, that this manner of actuating the guiding device is objectionable, particularly when the apparatus is employed in connection with a flying machine, as the amount of restoring force applied to the machine upon being materially displaced by a sudden gust of wind, for example, frequently would not be adequate to overcome the displacing force of the wind.

Accordingly, an object of the present invention is to improve apparatus of this type with a view, particularly, of overcoming the disadvantage above described.

To this end, a feature of the present invention contemplates the provision in an equilibrating apparatus for an object of mechanism operable to restore the object to a condition of equilibrium upon displacement therefrom, and controlling means for said mechanism to cause the mechanism to operate upon the object with a continually increasing force until the object commences to return to equilibrium. Preferably, the mechanism operable to restore the object to equilibrium operates upon the object with a decreasing force during the return movement of the object to equilibrium.

Other features of the present invention consist in certain constructions, arrangements and combinations of parts hereinafter described and claimed, the advantages of which will be obvious to those skilled in the art.

The several features of the present invention will be clearly understood from the following description and accompanying drawings, in which:—

Figure 1:
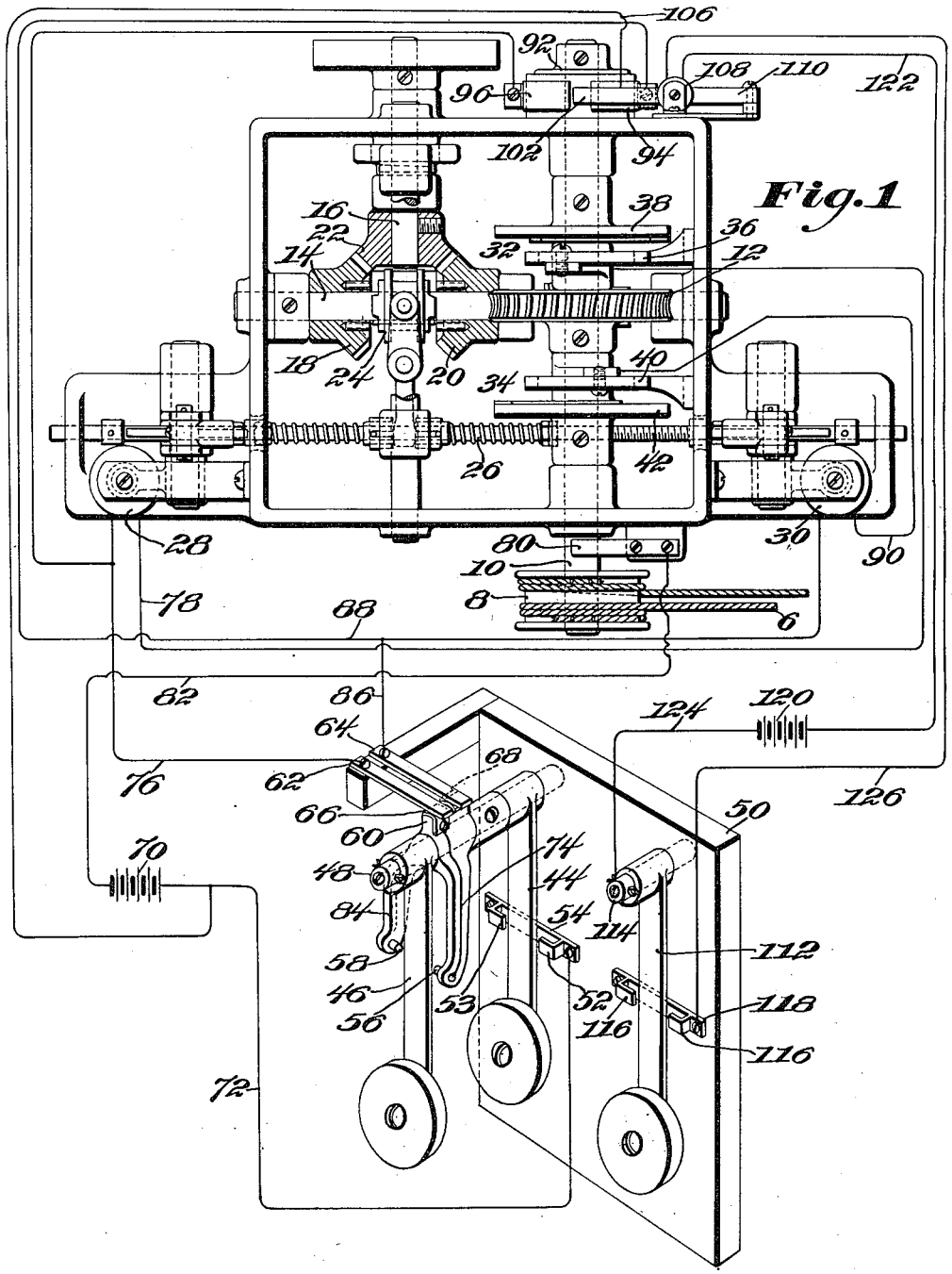
Figure 2:
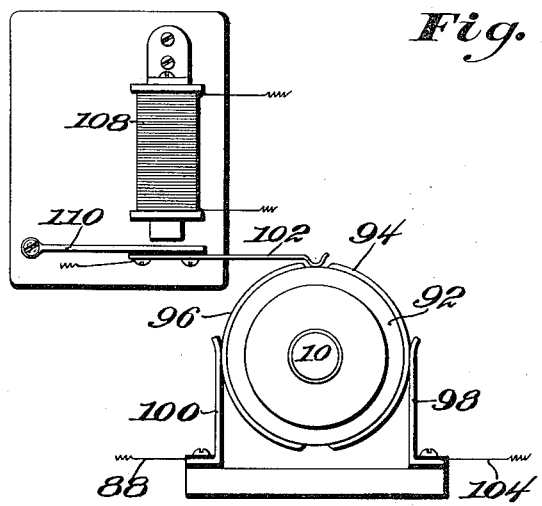

Figure 1 is a partly diagrammatical view of a portion of an apparatus embodying features of the invention in their preferred form, the actuating mechanism for the guiding device of the apparatus being shown in sectional plan and the controlling means therefor being shown in perspective; Fig. 2 is a detail side elevation of a part of the actuating mechanism of the guiding device; and Fig. 3 is a side elevation of the apparatus applied to a flying machine, the fuselage of which is shown diagrammatically in longitudinal section.

Figure 3:
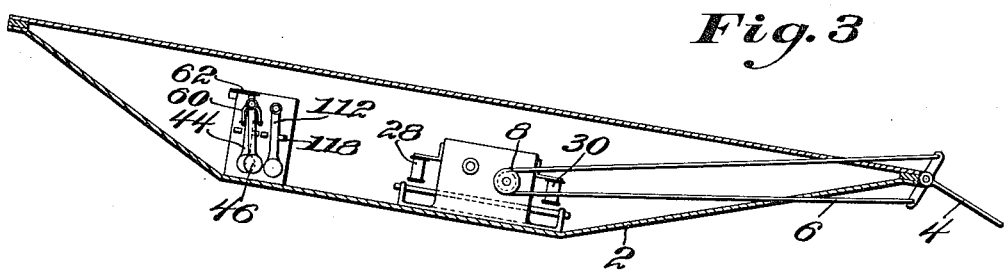

In Fig. 3 of the drawings the apparatus is shown embodied in a flying machine 2 having an elevator or rudder 4 mounted upon its rear end, which is adapted to be operated to maintain the longitudinal balance of the machine. The apparatus as illustrated in Fig. 3 is adapted to operate and control this rudder, and it will be apparent that a corresponding apparatus may be employed to operate and control ailerons for maintaining the lateral balance of the flying machine. The rudder 4 is operatively connected by a cable 6 with a windlass 8 that forms a part of the actuating mechanism for the rudder. This actuating mechanism for the rudder may be and preferably is the same as the rudder actuating mechanism described and claimed in applicant's copending application filed on even date herewith to which application reference may be had for a full and complete description of parts of the mechanism not fully described herein. This mechanism comprises a shaft 10 on which the windlass 8 is mounted, which shaft is connected by a worm and worm wheel 12 with a shaft 14. The shaft 14 is adapted to be driven in opposite directions by the driving shaft 16 of the mechanism through a reversible driving connection. This connection comprises a pair of bevel gears 18 and 20 loosely mounted on the shaft 14, which gears are constantly driven in opposite directions by means of a bevel gear 22 carried by the driving shaft 16. A clutch member 24 is keyed to the shaft between the gears 18 and 20 so that upon movement of the clutch member to the left from the neutral position shown in Fig. 1, the gear 18 will be clutched to the shaft 14 and upon movement of the clutch member to the right from neutral position the gear 20 will be clutched to the shaft 14. When the gear 18 is clutched to the shaft 14, the shaft will be turned in the direction to turn the rudder downwardly, and when the gear 20 is clutched to the shaft 14, the shaft will be turned in the opposite direction to turn the rudder upwardly.

The clutch member 24 is thus actuated by means of a constantly reciprocating rod 26 through connections comprising electro-magnets 28 and 30 included in electric circuits. Upon closing the electric circuit of the electro-magnet 28 the clutch member 24 will be shifted in the direction to clutch the shaft 14 to the gear 18, and upon opening this circuit the clutch member 24 will be returned to neutral position. Upon closing the circuit of the electro-magnet 30, the clutch member 24 will be shifted in the direction to clutch the shaft 14 to the gear 20, and upon opening the circuit the clutch member will be returned to neutral position.

In order to prevent the rudder from being turned in either direction beyond its most effective angular position with relation to the flying machine, means is provided for opening the circuit of the operating electro-magnet when such angular position of the rudder has been reached. This means comprises switches 32 and 34 which are included in the circuits of the electro-magnets 28 and 30 respectively, the switch 32 comprising a stationary switch member 36 and a movable switch member 38 carried by the windlass carrying shaft 10 and the switch device 34 comprising a stationary switch member 40 and a movable switch member 42 carried by the windlass carrying shaft 10.

The illustrated machine is provided with mechanism for controlling the operation of the rudder actuating mechanism in such a manner that at the start of a displacing movement of the flying machine from equilibrium, a predetermined uniform movement will be imparted to the rudder in a direction to restore the flying machine to equilibrium, and this movement of the rudder will continue until such time as the flying machine starts to return toward equilibrium. At the start of a return movement of the flying machine toward equilibrium, a predetermined uniform movement will be imparted to the rudder toward neutral position, and this latter movement of the rudder will continue until the flying machine has been restored to equilibrium, whereupon the rudder will be moved to its neutral position. This mechanism comprises a pair of pendulums 44 and 46 which are hung on a stud shaft 48 having one end secured to a supporting plate 50. The arm of the pendulum 44 is interposed between stationary contacts 52 and 53 formed on a bar 54 secured to and insulated from the supporting plate 50. The arm of the pendulum 46 extends between movable contacts 56 and 58 on the ends of depending arms of a bracket 60 loosely mounted on the stud shaft 48. The bracket 60 tends to be held in the position moved about the shaft 48, by leaf springs 62 and 64 having one end secured to an arm projecting from the supporting plate 50, and the under sides of their free ends engaging curved contact plates 66 and 68 secured to the upper end of the bracket 60.

With this construction, upon the flying machine becoming displaced in such a manner that its forward end is directed upwardly, as shown in Fig. 3, the stationary contact 52 is carried against the arm of the pendulum 44 thereby carrying the pendulum with it during the remainder of the displacing movement of the flying machine. Also, during this displacing movement of the flying machine, the movable contact 56 is carried against the arm of the pendulum 46 which prevents further angular movement of the bracket 60 relatively to the pendulum, the pendulum 46 remaining in its natural position. The engagement of the pendulums 44 and 46 with the contacts 52 and 56, through connections hereinafter described, closes the circuit of the electro-magnet 28 to turn the rudder downwardly so that the rudder will exert an increasing force tending to restore the flying machine to a condition of equilibrium. It will be apparent from an inspection of the drawings that the pendulums will maintain the circuit of the electro-magnet 28 closed until the flying machine starts to return to equilibrium and, consequently, the rudder will be actuated to exert a continually increasing restoring force during this time. At the start of the return movement of the flying machine to equilibrium, the movable contact 56 will be carried by its bracket 60 out of engagement with the pendulum and immediately thereafter the movable contact 58 will be brought into engagement with the arm of the pendulum which, through connections hereinafter described, acts to open the circuit of the magnet 28 and to close the circuit of the electro-magnet 30, the pendulum 44 of course remaining in engagement with the contact 52. It will be apparent that the closing of the circuit of the electro-magnet 30 will operate the rudder to exert a gradually decreasing restoring force on the flying machine until the machine reaches a condition of equilibrium.

As the flying machine reaches a condition of equilibrium, the pendulum 44 is permitted to assume its natural perpendicular position out of engagement with both contacts 52 and 53, the disengagement of the pendulum and the contact 52 acting to break the circuit of the electro-magnet 30, thereby stopping the return movement of the aileron. Upon displacement of the flying machine in the opposite direction, a circuit including the electro-magnet 30 is closed by the engagement of the stationary contact 53 with the arm of the pendulum 44 and by the engagement of the movable contact 58 with the arm of the pendulum 46. When the flying machine starts to return to equilibrium, the circuit of the electro-magnet 30 is opened by the disengagement of the contact 58 from the arm of the pendulum 46, and the circuit of the electro-magnet 28 is closed by the engagement of the movable contact 56 with the pendulum 46, this latter circuit being opened when the flying machine reaches a condition of equilibrium by the disengagement of the pendulum 44 and the stationary contact 52.

The electric circuits including the electromagnets 28 and 30 are illustrated diagrammatically in Fig. 1. The circuit of the electro-magnet 28 comprises a battery or other source of electrical energy indicated at 70, a wire 72 connecting the battery with the contact bar 54, the contact 52, pendulum 44, stud shaft 48, pendulum 46, movable contact 56, a wire 74 connecting the contact 56 with the contact plate 66, spring contact 62, and a wire 76 connecting the leaf spring 62 with one pole of the electro-magnet 28. The other pole of the electro-magnet 28 is connected with the battery 70 through the wire 78, switching device 32, windlass carrying shaft 10, a brush 80 engaging the shaft, and a wire 82 connecting the brush 80 with the battery 70.

The circuit of the other electro-magnet comprises the battery 70, the wire 72, contact bar 54, contact 53, pendulum 44, stud shaft 48, pendulum 46, movable contact 58, a wire 84 connecting the movable contact to the contact plate 68, the spring contact 64, a wire 86 branched to a wire 88 that is connected to one pole of the electro-magnet 30. The other pole of the electro-magnet 30 is connected to the battery through a wire 90, switching device 34, windlass carrying shaft 10, brush 80 and wire 82.

The illustrated apparatus is provided with means to insure the positioning of the rudder in neutral position when the flying machine has reached equilibrium. This means comprises a switch which is rendered operative when the flying machine is in equilibrium and which, in case the rudder is not at this time in neutral position, acts to close the circuit of the magnet 28 or 30 that will effect the turning of the rudder toward neutral position, this switch being similar to the one illustrated and described in applicant's co-pending application hereinbefore referred to that effects the restoring of the rudder to neutral position. The switch comprises a disk of insulation 92 carried by the windlass carrying shaft 10. The contact plates 94 and 96 are secured to the periphery of the disk 92 with their ends spaced from each other, as indicated in Fig. 2. The contact plates 94 and 96 are engaged by spring brushes 98 and 100, respectively, that are secured to the frame of the actuating mechanism for the aileron. When the flying machine is in equilibrium the periphery of the contact disk 92 is engaged by a contact brush 102, means being provided, however, so that when the flying machine is not in equilibrium the contact brush 102 will be out of engagement with the disk 92. The contact brush and the contact plates 94 and 96 are relatively positioned so that when the flying machine is in equilibrium and the aileron is in neutral position, the contact brush will engage the periphery of the disk 92 between corresponding ends of the contact plates 94 and 96. When, however, the rudder is raised above neutral position, for example, the angular position of the shaft 10 will be such as to position the contact plate 94 in engagement with the contact brush 102, and if the rudder is below neutral position, the contact plate 96 will engage the contact brush 102. The engagement of the contact plate 94 with the contact brush 102 acts to close the circuit of the electro-magnet 28, thereby imparting a movement to the rudder toward neutral position, and when the rudder has reached neutral position the circuit will be broken by the disengagement of the contact plate 94 from the contact brush 102. The engagement of the contact plate 96 with the contact plate 102 acts to close the circuit of the electro-magnet 30, thereby moving the rudder upwardly toward neutral position, and when the rudder has reached neutral position this circuit is closed by the disengagement of the contact plate 96 with the contact 102. The circuit connection between the contact plate 94 and the electro-magnet 28 comprises the contact brush 98 and a wire 104 that is branched to the wire 76 leading to the electro-magnet, the contact brush 102 being connected to the battery 70 by a wire 106 that is branched to the wire 72. The circuit connection between the contact plate 96 and the electro-magnet 30 comprises the contact brush 100 and the wire 88.

The contact brush 102 is held in raised position out of engagement with the disk 92 when the flying machine is not in a condition of equilibrium, to render the switch 91 inoperative at this time by means of an electro-magnet 108 and associated armature 110. The electro-magnet 108 is secured to the frame of the aileron actuating mechanism. The armature 110 is located beneath the electro-magnet and comprises an arm pivoted at one end on the frame. The contact brush 102 is secured to and insulated from the other end of the armature arm. When the circuit of the electro-magnet 108 is closed the magnet acts through the armature to raise the contact brush 102 out of engagement with the disk 92, thereby rendering the switch inoperative. Upon opening he circuit embodying the electro-magnet 108, the contact brush is permitted to reengage the disk 92 thereby rendering the switch operative. The opening and closing of this circuit is controlled by a pendulum 112 that is hung on a stud shaft 114 secured to the supporting plate 50. The arm of the pendulum extends between contacts 116 formed on a bar 118 secured to the supporting plate 50. When the flying machine is displaced in either direction from equilibrium, the arm of the pendulum engages one of the contacts which closes the circuit of the electro-magnet 108 to render the switch 91 inoperative. Upon the flying machine reaching a condition of equilibrium, both contacts 116 will be out of engagement with the arm of the pendulum which will open the circuit of the electro-magnet 108 to render the switch 91 operative which, as above described, will act to restore the rudder to neutral position in case it is out of neutral position at this time.

The circuit of the electro-magnet 108 comprises a battery 120 having one terminal connected by a wire 122 to one pole of the electro-magnet and its other terminal connected to the other pole of the electro-magnet by a wire 124, the shaft 114, pendulum 112, contact bar 118, and a wire 126.

While the features described herein are well adapted for use in a flying machine, it is to be understood that, except as defined in the claims, the features of the present invention are not limited to use in any particular type of machine or object.

The nature and scope of the present invention having been indicated and an apparatus embodying the several features of the invention in their preferred form having been specifically described, what is claimed as new is:

1. A controlling apparatus for an object having, in combination, a guiding device, and means for moving the guiding device in a direction to restore the object to normal position upon its displacement therefrom until the object starts to return to normal, for moving the guiding device in the opposite direction following a return movement of the object and to stop said movement upon the return of the object to normal position.

2. An equilibrating apparatus having, in combination, a guiding device, and means for moving the guiding device at a predetermined rate of travel in a direction to restore the object to a condition of equilibrium upon its displacement therefrom until the object starts to return to normal, to move the guiding device in the opposite direction during the return movement of the object toward equilibrium and to stop said movement upon the return of the object to normal position.

3. An equilibrating apparatus having, in combination, a guiding device, two pendulums, means controlled by one of the pendulums to move the guiding device continually in a direction to restore the object to a condition of equilibrium upon the displacement therefrom until the object starts to return to equilibrium and to move the guiding device in the opposite direction during a return movement of the object to equilibrium, and controlled by the other pendulum to return the guiding device to neutral position after the object has been restored to equilibrium.

4. An equilibrating mechanism for flying machines having, in combination, an electric circuit comprising two pair of contacts and two cooperating contacts for respectively selectively engaging the contacts of each pair, means whereby each of said two contacts respectively engages one or the other cooperating contact of the corresponding pair upon the displacement of the flying machine in one direction or the opposite direction from a condition of equilibrium, means whereby one of said two contacts becomes disengaged from its cooperating contact upon the commencement of the restoring movement of the machine, and means whereby the other of said two contacts remains in engagement with its cooperating contact until the machine is restored to equilibrium.

5. An equilibrating mechanism for flying machines having, in combination, a guiding device, operating means therefor, an electric circuit for controlling the operating means comprising a pair of contacts fixed to the flying machine, a pendulum mounted upon the machine so as to effect engagement with one or the other of the fixed contacts upon the displacement of the machine from equilibrium, a pair of contacts bodily movable as a unit with respect to the machine, and a pendulum mounted upon the machine so as to effect engagement with one or the other of the bodily movable contacts to effect their bodily movement therewith with respect to the machine upon the displacement of the machine from equilibrium, said circuit being closed only when the pendulums are each in engagement with a contact, the first-named pendulum being adapted to remain in engagement with the contact engaged therewith until the machine is restored to substantial equilibrium, and the second-named pendulum being adapted to become disengaged from the contact engaged therewith upon the commencement of the restoring movement of the machine and to become engaged with the other bodily movable contact to cause a bodily movement in the opposite direction of the bodily movable contacts with respect to the machine upon a further predetermined movement of the machine.

6. A controlling mechanism for a moving object having, in combination, a guiding device, actuating mechanism therefor acting when thrown into operation to move the guiding device to an extent which is independent of the extent of displacement of the object, and controlling devices acting automatically upon displacement of the object from normal position to cause the actuating mechanism to move the guiding device in a direction to restore the object, to move the guiding device in the opposite direction following a return movement of the object and to return the guiding device to neutral position upon the return of the object to normal position.

ERASTUS E. WINKLEY.